United States Patent
Cogill et al.

(10) Patent No.: US 11,074,513 B2
(45) Date of Patent: *Jul. 27, 2021

(54) DISRUPTION FORECASTING IN COMPLEX SCHEDULES

(71) Applicant: International Business Machines Corporation, Armonk, NY (US)

(72) Inventors: Randall L. Cogill, Dublin (IE); Jakub Marecek, Dublin (IE); Martin Mevissen, Dublin (IE); Paulito Palmes, Dublin (IE); Robert Shorten, Dublin (IE); Fabian R. Wirth, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 766 days.

This patent is subject to a terminal disclaimer.

(21) Appl. No.: 14/657,378

(22) Filed: Mar. 13, 2015

(65) Prior Publication Data

US 2016/0267390 A1  Sep. 15, 2016

(51) Int. Cl.
- G06N 7/00 (2006.01)
- G06Q 10/06 (2012.01)
- G06N 20/00 (2019.01)

(52) U.S. Cl.
CPC ............ *G06N 7/005* (2013.01); *G06N 20/00* (2019.01); *G06Q 10/0635* (2013.01); *G06Q 10/06311* (2013.01)

(58) Field of Classification Search
CPC .................................................... G06N 7/005
See application file for complete search history.

(56) References Cited

U.S. PATENT DOCUMENTS

| 7,161,501 B1 | 1/2007 | Lynch et al. |
| 7,912,742 B2 | 3/2011 | Trautman |

(Continued)

FOREIGN PATENT DOCUMENTS

CN  101369379 A  2/2009

OTHER PUBLICATIONS

Meester et al, Stochastic delay propagation in railway networks and phase-type distributions, 2007.*

(Continued)

*Primary Examiner* — James D. Rutten
(74) *Attorney, Agent, or Firm* — Cantor Colburn LLP; Kurt Goudy

(57) ABSTRACT

A method for forecasting time delays added to a scheduled start time and a scheduled end time of a task includes generating a stochastic model of the task and resources affecting the task, the stochastic model includes a reactionary delay component that is a function of previous task end times and a root cause delay component that is an independent random process at a specific time. The method further includes: calculating a probability distribution of time delays added to the scheduled start time as a combination of the reactionary delay component and the root cause delay component using the stochastic model to provide a probability distribution of start times; and calculating a probability distribution of time delays added to the scheduled end time as a combination of the reactionary delay component and the root cause delay component using the stochastic model to provide a probability distribution of end times.

19 Claims, 9 Drawing Sheets

(56) References Cited

U.S. PATENT DOCUMENTS

| | | | |
|---|---|---|---|
| 8,407,163 B2* | 3/2013 | Andreoli | G06F 11/0751 |
| | | | 706/12 |
| 8,612,126 B2 | 12/2013 | Barry et al. | |
| 9,459,108 B2* | 10/2016 | Berlingerio | G01C 21/3423 |
| 2002/0002548 A1 | 1/2002 | Roundtree | |
| 2005/0071206 A1 | 3/2005 | Berge | |
| 2006/0106530 A1* | 5/2006 | Horvitz | G08G 1/0104 |
| | | | 701/117 |
| 2009/0059937 A1* | 3/2009 | Kanada | H04L 41/5003 |
| | | | 370/401 |
| 2009/0219992 A1* | 9/2009 | Wang | H04L 1/0014 |
| | | | 375/240.03 |
| 2011/0082636 A1* | 4/2011 | Barker | G08G 1/0104 |
| | | | 701/118 |
| 2012/0218127 A1 | 8/2012 | Kroen | |
| 2012/0226647 A1 | 9/2012 | Murray et al. | |
| 2014/0095066 A1 | 4/2014 | Bouilet et al. | |

OTHER PUBLICATIONS

Murali et al, A Delay Estimation Technique for Single and Double-Track Railroads (Year: 2010).*

L. Palopoli, D. Fontanelli, N. Manica and L. Abeni, "An Analytical Bound for Probabilistic Deadlines," 2012 24th Euromicro Conference on Real-Time Systems, Pisa, 2012, pp. 179-188, doi: 10.1109/ECRTS.2012.19. (Year: 2012).*

Klein, et al. " Airport Delay Prediction Using Weather-Impacted Traffic Index (WITI) Model", 2010 IEEE/AIAA 29th Digital Avionics Systems Converence, Oct. 3-7, 2010; 13 pages.

List of IBM Patents or Patent Applications Treated as Related; YOR920150135US1, Date Filed Mar. 13, 2015, pp. 1-2.

Randall Cogill, et al., "Disruption Forecasting in Complex Schedules," U.S. Appl. No. 14/746,282, filed Jun. 22, 2015.

* cited by examiner

DISRUPTION FORECASTING IN COMPLEX SCHEDULES

BACKGROUND

The present invention relates to system and method for forecasting a probabilistic distribution of time delays added to a scheduled start time and a scheduled end time of a task. Specific applications include forecasting probabilistic distributions of arrival times and departure times for an item such as a transport or a work piece in a process.

Many types of processes involve the arrival and departure of a certain type of item such as a train at a railroad station or a work piece at a machining station. While an arrival time and departure time may be scheduled or planned, in certain cases the item may arrive later than scheduled and thus depart later than scheduled. These delays can have ramifications in the associated process such as causing other delays that can propagate throughout the process. The cost of some types of delays may be minimal while other types of delays may cause multiple delays throughout the process and thus be very costly.

Disclosed is a method for forecasting time delays added to a scheduled start time and a scheduled end time of a task. The method includes: generating a stochastic model of the task and resources affecting the task, the stochastic model comprising a reactionary delay component and a root cause delay component, the reactionary component being a function of previous task end times and the root cause delay component being an independent random process at a specific time; calculating a probability distribution of time delays added to the scheduled start time as a combination of the reactionary delay component and the root cause delay component using the stochastic model to provide a probability distribution of start times; and calculating a probability distribution of time delays added to the scheduled end time as a combination of the reactionary delay component and the root cause delay component using the stochastic model to provide a probability distribution of end times; wherein the generating, the calculating a probability distribution of time delays added to the scheduled start time, and the calculating a probability distribution of time delays added to the scheduled end time are implemented by a processor.

Also disclosed is a system method for forecasting time delays added to a scheduled start time and a scheduled end time of a task. The system includes a processor configured to: generate a stochastic model of the task and resources affecting the task, the stochastic model comprising a reactionary delay component and a root cause delay component, the reactionary component being a function of previous task end times and the root cause delay component being an independent random process at a specific time; calculate a probability distribution of time delays added to the scheduled start time as a combination of the reactionary delay component and the root cause delay component using the stochastic model to provide a probability distribution of start times; calculate a probability distribution of time delays added to the scheduled end time as a combination of the reactionary delay component and the root cause delay component using the stochastic model to provide a probability distribution of end times; transmit a signal comprising the probability distribution of start times and the probability distribution of end times to a signal receiving device. The system further includes a signal receiving device configured to receive the signal comprising the probability distribution of start times and the probability distribution of end times.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of systems and methods described herein relate to calculating a probabilistic delay distribution for scheduled resources such as transports or work pieces in non-limiting embodiments. Rather than forecasting a single number for a delay time, the systems and methods give an explicit probability distribution over possible delays. Consider the following example. Suppose a railway operations controller is evaluating a particular train scheduled in the near future. It might be the case that a departure delay under 40 minutes for this train will incur relatively little cost to the railway, but a delay exceeding 40 minutes could be very costly due to missed passenger connections, missed departure slots at stations, crew overtime, etc. If the operations controller knows that there is a 35% chance of a delay over 40 minutes, he or she can weigh the potential cost and risk of not acting against the cost of some mitigating action, like swapping the rail equipment assigned to this train. A single point forecast that does not account for uncertainty, such as "the expected departure delay is 26 minutes" is far less useful for guiding this decision.

The systems and methods disclosed herein identify and characterize the behavior of "delay states" from historical data. These states capture the time-dependent nature of certain kinds of delays, which are useful for accurately forecasting future delays. As a railway example of a delay state, suppose that many trains are experiencing departure delays from Boston on a winter morning. A person would reason that "there is probably bad weather in Boston right now and that will probably continue to affect departures for at least the next several hours." The systems and methods disclosed herein identify patterns indicating these types of time-dependent sources of delay from data, and characterize the magnitude of delays experienced in each state together with the usual duration of time spent in each state.

Figure 1:
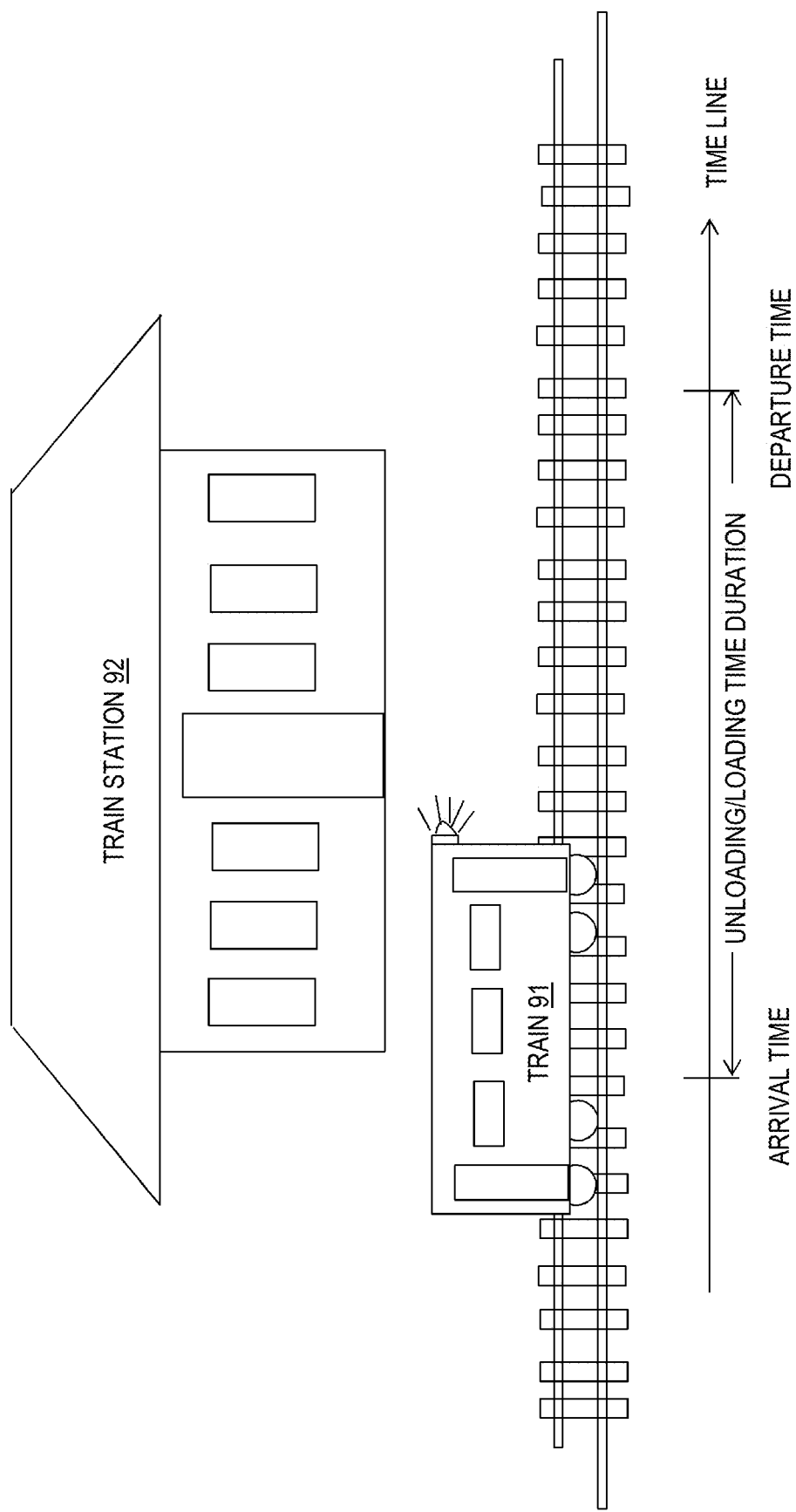
FIG. 1 is a schematic diagram depicting aspects of a train arriving and later departing a train station according to an embodiment of the invention.
Figure 2:
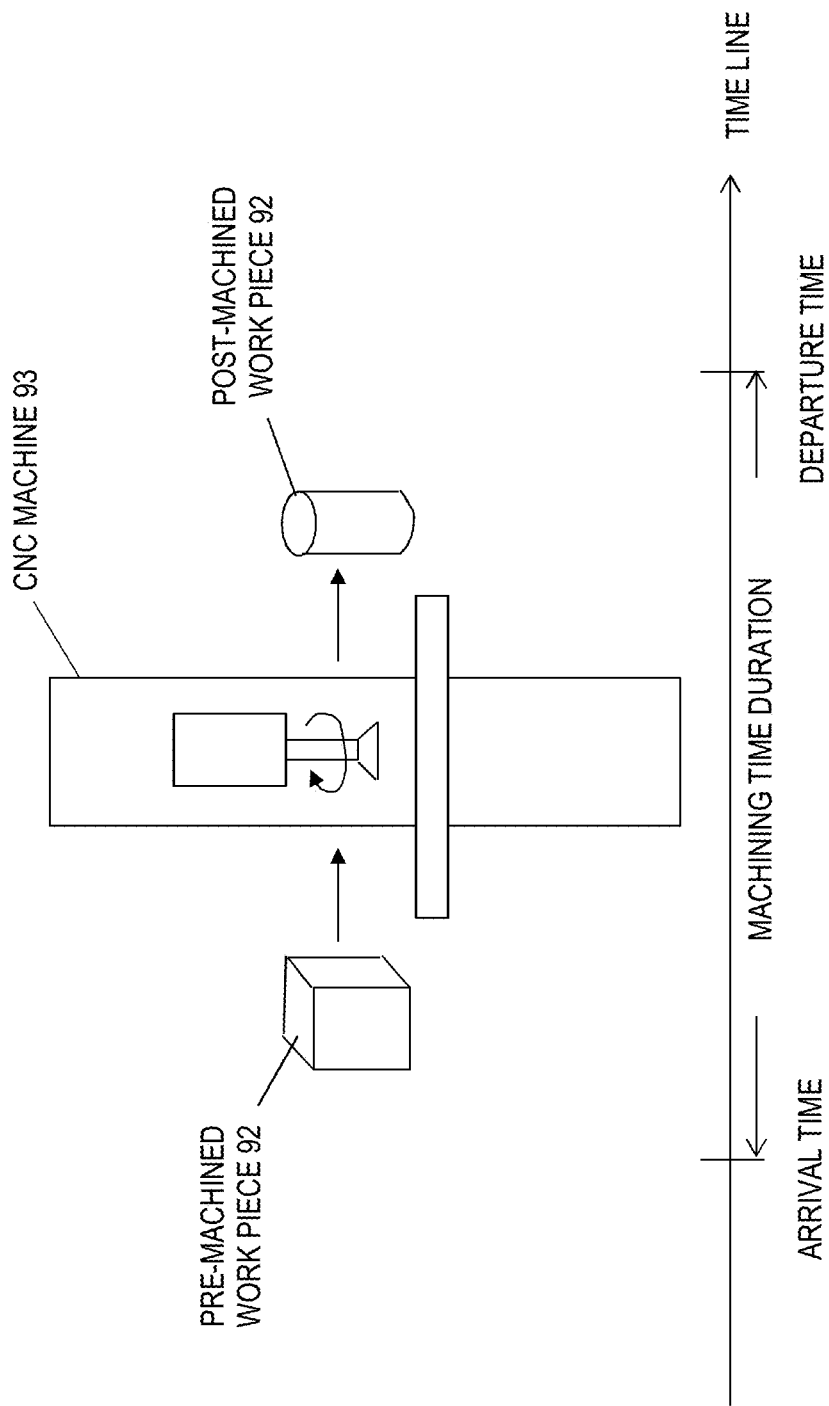
FIG. 2 is a schematic diagram depicting aspects of a work piece arriving at a computerized numerical control (CNC) machine for machining and then later departing the CNC machine after being machined according to an embodiment of the invention.

It can be appreciated that the systems and methods disclosed herein may be applied to various processes. One process for teaching purposes is a transport process such as a railway process for transporting passengers. FIG. 1 is a schematic diagram depicting aspects of a train 90 arriving and later departing a train station 91 according to an embodiment of the invention. The train 90 has an arrival time, a task time such as unloading and loading passengers, and a departure time. It can be appreciated that the train 90 may be representative of a transport in other types of transportation systems. Another example of a process is a manufacturing process such as machining a work piece. FIG. 2 is a schematic diagram depicting aspects of a work piece 92 arriving at a computerized numerical control (CNC) machine 93 for machining and then later departing the CNC machine after being machined according to an embodiment of the invention.

Figure 3:
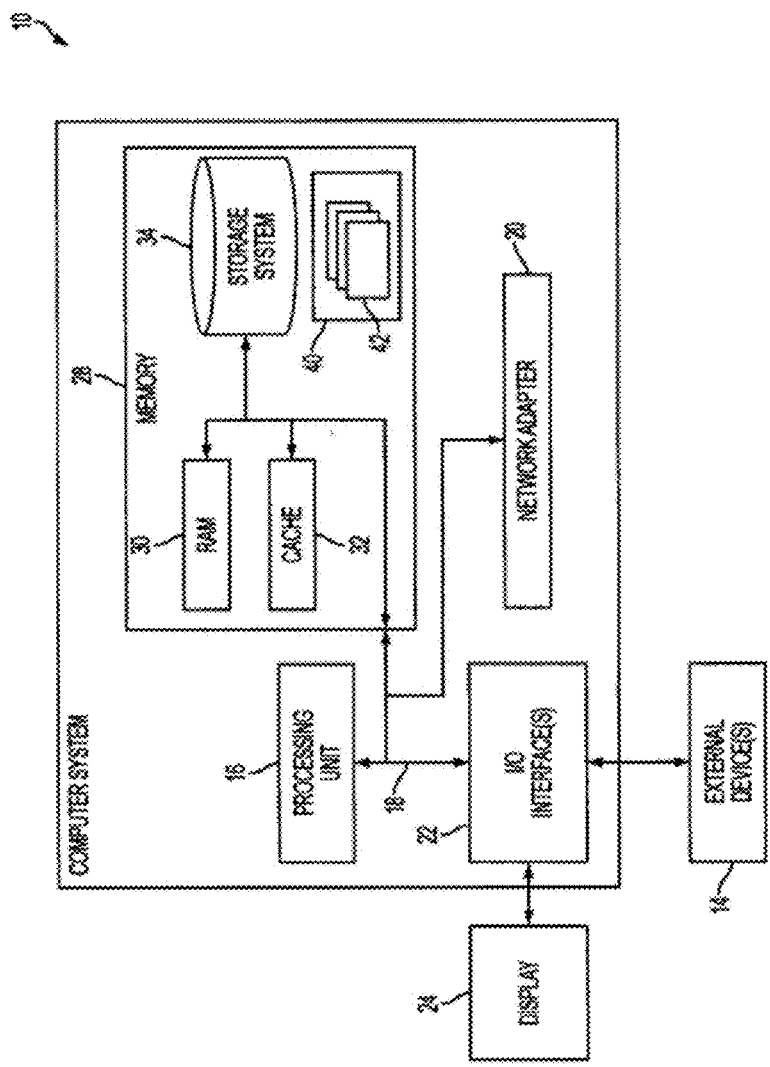
FIG. 3 is a schematic diagram of a computer processing system for implementing a method for disruption forecasting in complex schedules.

FIG. 3 depicts a block diagram of a computer system for implementing the teachings disclosed herein according to an embodiment. Referring now to FIG. 3, a block diagram of a computer system 10 suitable for providing communication over cross-coupled links between independently managed compute and storage networks according to exemplary embodiments is shown. Computer system 10 is only one example of a computer system and is not intended to suggest any limitation as to the scope of use or functionality of embodiments described herein. Regardless, computer system 10 is capable of being implemented and/or performing any of the functionality set forth hereinabove.

Computer system 10 is operational with numerous other general purpose or special purpose computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 3, computer system 10 is shown in the form of a general-purpose computing device, also referred to as a processing device. The components of computer system may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, and data archival storage systems, etc.

The systems and methods disclosed herein cover two use cases with two distinct input-output combinations, but having a common forecasting algorithm as discussed further below. In both cases, historical schedule and delay data, planned schedule and real-time delay data are input into a stochastic model. The forecasting algorithm then operates on the stochastic model.

Figure 4:
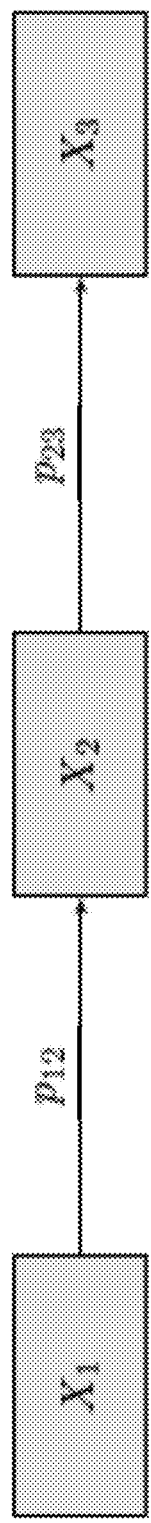
FIG. 4 depicts aspects of a Markov model with three states.

In the next three paragraphs, a Markov model and a hidden Markov model for use herein are discussed in general. Markov models are one of the most basic stochastic models, which are fully determined by a set of states $X=\{X_i\}$ and transition probabilities $p_{ij}$ from state $X_i$ to state $X_j$. The transition probabilities can be seen as a matrix $p=(p_{ij})$ or a probability distribution of the next state, conditional on the current state. FIG. 4 illustrates one example of a Markov model.

Figure 5:
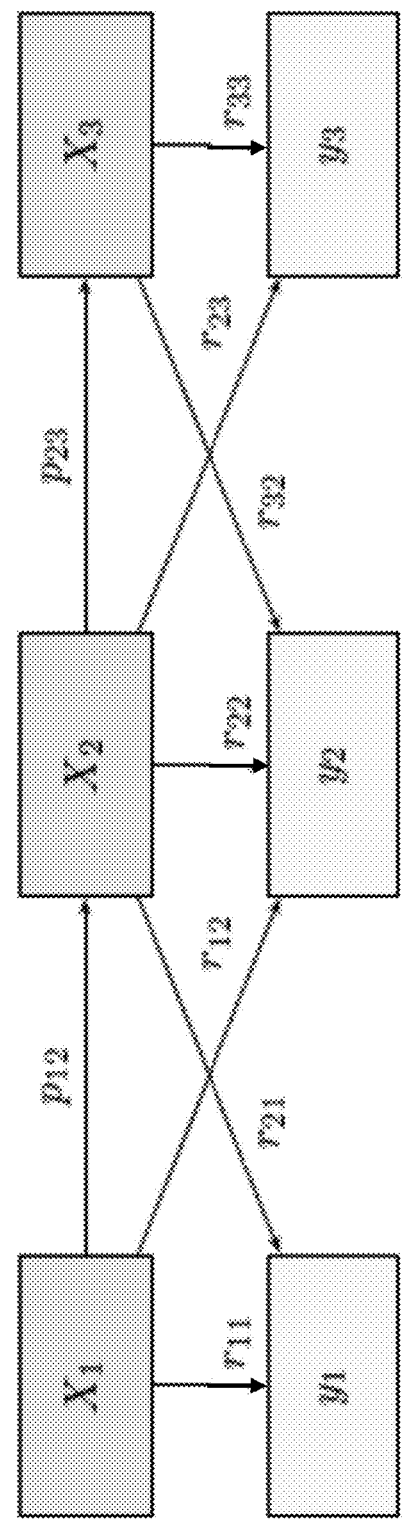
FIG. 5 depicts aspects of a Markov model with three states and emissions from the three states.

Notice that the states are often not observable. Instead, "emissions" are observed within a set $Y=\{y_j\}$, where the emission probabilities $r^{ij}$ of producing $y_j$ in state $X_i$ can be seen as a matrix $r=(r_{ij})$ or a probability distribution of the emission of $y_j$, conditional on the current state $X_i$. FIG. 5 illustrates one example of a Markov model with three states and emissions.

The problem of estimating the most likely X, p and r, given, y, is known as the problem of training a Hidden Markov Model (HMM). Once a HMM is trained it becomes just a Markov model. A hidden Markov model (HMM) is a statistical model, which assumes the system is a Markov process with unobserved (hidden) states X, observations y, state transition probabilities p, and output probabilities r.

Training of an HMM model involves, given a history of observations y, estimating the most likely state transition probabilities p and output probabilities r. Application of the HMM model involves considering the state transition probabilities p and output probabilities r learned previously, using a history of observations y, to estimate the next state and observation. In a number of fields, including information theory, signal processing, and speech recognition, algorithms have been developed to compute the local maximum likelihood solution of the problem of training the HMM model in polynomial time. In particular, reference may be had to the algorithms of Viterbi, Baum-Welch, and Baldi-Chauvin.

The application of an HMM takes the input of: N—number of states; T—number of observations; $y_t=1 \ldots T$—observation at time t; $\theta_i=1 \ldots N$—emission parameter associated with state I; $\phi_1=1 \ldots N$, $j=1 \ldots N$—probability of transition from state i to state j; $x_t=1 \ldots T$—state at time t; $F(y|\theta)$—probability distribution of an observation, parameterized on $\theta$ and assuming $x_T+1 \sim \text{Categorical}(\phi_{xT})$, $y_{T+1} \sim F(\theta_{xT})$ and produces: $F(x_{T+1}|y, x)$—probability distribution of the next state, parameterized on the above; and $F(y_{T+1}|y, x)$—probability distribution of the next observation, parameterized on the above, which can be done in time linear in the dimensions of the output, for a samples-based representation of the distributions. Notice that Categorical refers to a discrete random variable, i.e. a variable with a finite support set.

Iterated application of the HMM model involves considering the state transition probabilities p and output probabilities r learned previously, using a history of observations y, to estimate the next k states and k observations, in a recursive fashion. Notice that by iterated application of the HMM model, one can estimate the states and emissions arbitrarily far in the future.

The disclosure is discussed in a general form, before two specific examples in scheduling and railway operations are introduced.

Consider a problem where there is a set of tasks and a set of resources. A partial order O on the set of tasks, in which the tasks are to be performed, is known. Formally, a partial order is a relation, which is reflexive, antisymmetric, and transitive. The start time $s_i$ when the task i should be performed is also known. One task can possibly include of multiple sub-tasks, which have to take place in a given order, one after another. Each task i can hence be associated with one start time $s_i$ and multiple further times corresponding to the start-times of the sub-tasks. Multiple bipartite graphs may be used to capture the resource requirements required for tasks and sub-tasks. In each, one part of the vertices represents the tasks and one part of the vertices represents the resources, and there are no edges between two resources. Each task requires all resources it is adjacent to in one of the bipartite graphs, but the choice of the graph to use can vary task to task.

In the setting above, it is assumed that there is a state $X_{r,t}$ of each resource r, which changes over time t, with the changes governed by a random process, but that the state is not directly observable. The random processes may or may not be independent across the resources. It is not assumed that the range is known, from which the values $X_{r,t}$ are drawn, but it is assumed that its cardinality is known.

In the setting above, once a task i starts, one can obtain one observation of the actual start time, denoted $a_i$, and multivariate, mixed-integer "additional information" $c_1$, which are related to the state $X_{r,ai}$ of all resources r required by task i at time $a_i$. That is, the "additional information" may describe multiple categorical phenomena, which are encoded as integers, and multiple phenomena, which are described by real numbers. For example, the state of one resource may be, in part, described by the weather at the location of the resource, which can be described by the wind speed (real variable) and the information whether the sun is visible (binary, i.e. integer, variable).

In the setting above, at time t, one can describe the actual start times $a_i$ and the additional information $c_i$ for all the tasks i that have started by time t, as the "delay data".

In the setting above, it is desired to forecast the actual start time of task i as a random variable $A_i$ using a two-factor model, where $A_i$ is a convolution of the two factors. One factor is the "reactionary delay component", which is a function of the actual start times $A_j$ for all (i, j) in the partial order O. The other factor is the "the root cause delay component," which is based on the unobservable states of the resources required by the task in one of the bipartite graphs. Notice that at time t, one can use the observations of actual start times $a_j$ for all (i, j) in the partial order O, where task j has started by time t, and an estimate of $A_j$ for all (i, j) in the partial order O, where task j has not started by time t. Notice that at any time t, one may have to use an estimate of the state $X_{r,t}$ of all resources r used by task i in one of the bipartite graphs, in the order to estimate the root cause delay component of the actual start time $A_i$.

Figure 6:
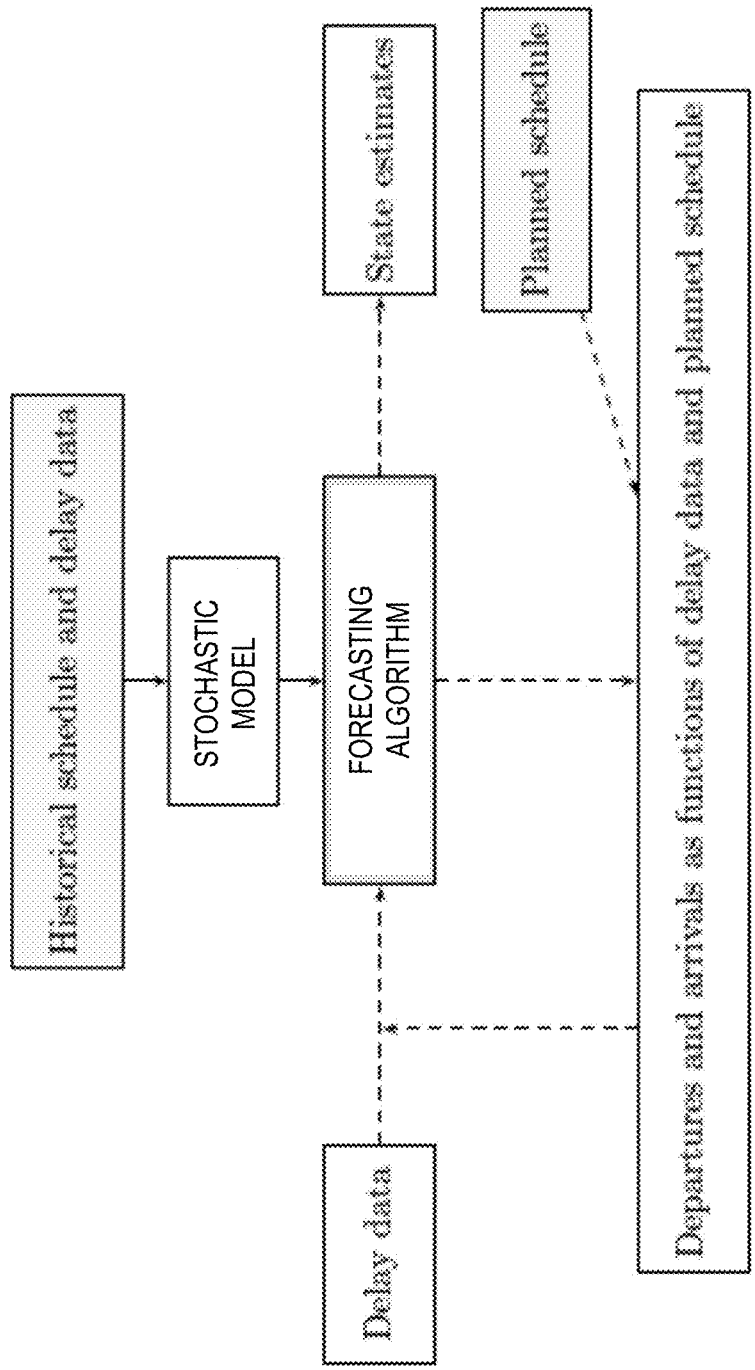
FIG. 6 depicts aspects of data inputs and calculated outputs using a process model and forecasting.

The system and method described herein output a stochastic model, which given the delay data up to time t, produces estimates of probability distributions of the actual start times $A_i$ for each scheduled task i, which has not been started at time t, yet, as illustrated in FIG. 6, and given the same input, estimates of probability distributions of states $X_{r,u}$ for all times u>t and all resources r. Notice that the outputs of the disclosed system and method are functions.

The method operations above hence include two steps: obtaining the stochastic model ("training") and applying the stochastic model ("forecasting").

Subsequently to forecasting, the method operations above at time t may also include considering a risk measure of the random variables comprising times $A_i$ for each scheduled task i, which has not been started at time t, yet, and states $X_{r,u}$ for all times u>t and all resources r ("risk estimation"). Formally, a risk measure is a mapping from a set of random variables to the real numbers. One may consider, e.g., the mode, or the most likely time. One may also consider the expectation of the random variable. These two would be "risk neutral" risk measures. One may also consider the value at risk with coefficient c of the random variable, which is the value of the cumulative distribution function at a certain probability c. One may also consider the conditional value at risk with coefficient c' of the random variable, which is the value of the cumulative distribution function integrated over an interval [c', 1] for continuous random variables. Those are "basic-risk averse" approaches.

Subsequently to risk estimation, the method operations above at time t may also include displaying the random variables comprising times $A_i$ for each scheduled task i, which has not been started at time t, yet, and states $X_{r,u}$ for all times u>t and all resources r to a user approximately using a user interface (e.g., a display or printer). One may, e.g. update a graphical representation of the schedule in the form of a Gantt chart, with the blocks representing the tasks moved by the amount suggested by the risk measure, or vary the size and the transparency of the blocks, so as to suggest what is the probability of their starting at the given times. Considering there is a fixed resolution of the screen, one can capture the random variable only approximately, in effect producing a histogram approximation. One may also represent the possible evolutions of the state of each resource over time by plotting several sample paths in a plot, where the horizontal axis is the time and the vertical axis is the state or the value of some function thereof.

Subsequently to risk estimation, the method operations at time t above may also include storing the approximate representation of random variables comprising times $A_i$ for each scheduled task i, which has not been started at time t, yet, and states $X_{r,u}$ for all times u>t and all resources r in memory or a storage medium. The representations include the histogram approximations and sample paths approximations, as above.

Subsequently to risk estimation, the method operations may also include updating a schedule to consider the times as random variables or any of their risk measures as discussed above.

Development of the stochastic model for scheduling a machining application job is now discussed. This gives the complete detail for a simple example. In the usual job scheduling problem, let $M=\{M_1, M_2, \ldots, M_m\}$ be a finite set of "machines" and $J=\{J_1, J_2, \ldots J_n\}$ a finite set of "jobs". For each 1≤j≤n, job $J_j$ to be processed by a prescribed sequence of machines, $s_j \in M \times M \times \ldots M$, 1≤l≤n. For example, if sequence $s_1$ for job $J_1$ is $(M_3, M_2, M_1)$, the job has to be processed at machine $M_3$ first, then at $M_2$, and $M_1$. Each machine $M_z$ can accept any job with sequence $(M_x, \ldots, M_y, M_z, \ldots)$ that has been processed on machines $M_x, \ldots, M_y$ and has not been processed on $M_z$. The processing of a job j by a machine i is denoted by: (i,j). Further, a generalization of the job-scheduling concept towards resources is considered. (Similar generalizations underlie much of project scheduling, but the exact formalization varies, so one formalization is introduced here.) Let $R_{i,j} \subset M \times J$, 1≤i≤m, 1≤j≤n denote the set of jobs, which need to be processed before job $J_j$ can be processed at machine $M_i$. Clearly for every job j with sequence $S_j( \ldots, M_y, M_z, \ldots )$.

With respect to processing and set-up times, two quantities are defined. The first quantity is time- and machine-dependent processing time $p_{j,\alpha,t}=Y_{\alpha,t}+f(j,t)$, which is the time it takes to process job $J_j$ at machine $\alpha$ at time t. Notice that for a discretization of time, $p_{j,\alpha,t}$ could be seen as a rank-2 tensor, which can be factored into a random matrix $Y_{\alpha,t}$ and a deterministic function $f(j,t)$, representable by a matrix. The second quantity is sequence-dependent set-up time $\tau_{\alpha,\beta}+V_{\alpha,\beta}$, 1≤m, n≤m, which is the time taken to move any job from machine $\alpha$ to machine $\beta$, or possibly, the time it takes to prepare machine $\alpha$ for processing any job, which has been previously processed at machine $\beta$. The sequence dependent set-up times is composed of a deterministic component, represented by a full m×m matrix $T=(\tau_{\alpha,\beta})$ and a noise term $V_{\alpha,\beta}$. Sequence-dependent set-up time $\tau_{\alpha,\beta}+V_{\alpha,\beta}$, 1≤m, n≤m, which is the time taken to move any job from machine $\alpha$ to machine $\beta$, or possibly, the time it takes to prepare machine $\alpha$ for processing any job, which has been previously processed at machine $\beta$. The sequence dependent set-up times is composed of a deterministic component, represented by a full m×m matrix $T=(\tau_{\alpha,\beta})$ and a noise term $V_{\alpha,\beta}$.

Four representations of a "solution" of the scheduling problem are now introduced. "The Plan": Let X denote all possible assignments of jobs to machines, such that each job is performed exactly once at each machine within its prescribed sequence. Elements x∈X may be written as n×m matrices, where column i represents jobs that machine $M_i$ accepts, in the given order. For example, the sparse matrix $$x = \begin{pmatrix} 2 & 2 & 1 \\ 3 & 2 & 1 \\ 1 & 3 & \end{pmatrix}$$

presents machine $M_1$ performs three jobs $J_2, J_3, J_1$ in the order $J_2, J_3, J_1$, while machine $M_2$ will accept the jobs in the order $J_1, J_2, J_3$ and machine $M_3$ will accept the jobs in the order $J_1, J_3$. "The Schedule": for each 1≤i≤m and 1≤j≤n, $s_{i,j}$ denotes the scheduled time of processing job $J_j$ on machine $M_i$, with $s_{i,j}$ undefined, if $S_j$ does not include $M_i$. Unless stated otherwise, we assume $s_{i,j}$ is a deterministic non-negative integer. The schedule can be represented as a sparse m×n matrix $S=s_{i,j}$. "The Actual Times": for each 1≤i≤m and 1≤j≤n, $D_{i,j}$ and $A_{i,j}$ are random variables representing the actual time of starting and finishing job $J_j$ on machine $M_i$, with $A_{i,k}, D_{i,j}$ undefined, if $S_j$ does not include $M_i$. "The Observations": for each 1≤i≤m and 1≤j≤n, $Y_{i,j}$ represents one sample of the random variable $Y_{i,t}$ drawn by processing job $J_j$ on machine $M_i$ at time $A_{i,j}$. Observations of the actual times could be introduced as well, but those will not be necessary for the present discussion.

Figure 11:
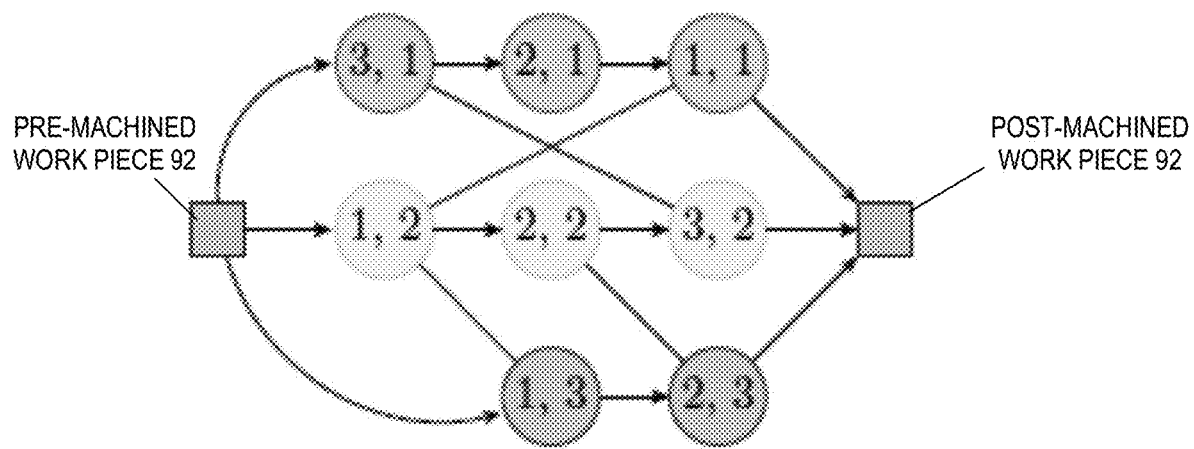
FIG. 11 depicts aspects of a Gantt chart for a machining application.

In scheduling, it is customary to represent problem instances by graphs and combinations of instances and "the plan" by planar embeddings of such graphs, sometimes related to the so called "Gantt charts" as illustrated in FIG. 11. In such graphs and embeddings, oriented edges (i.e., horizontal) represent the sequences, in which each job should be accepted by machines, while non-oriented (i.e., diagonal) edges represent the exclusion constraints: the fact two jobs may not run at the same machine at one time. (Non-oriented edges represent further requirements within $R_{i,j}$). In the planar embeddings, each job is represented by one row, with time plotted on the horizontal axis. In the example in FIG. 11, the second job in the second row cannot be performed at the same time as the second job in the third row, the first job in the second row cannot be performed at the same time as the first job in the third row or the third job in the first row, and the first job in the first row cannot be performed at the same time as the third job in the second row. In practice, "machines" may represent actual CNC machines and "jobs" may represent the physical artifacts or work pieces to be machined. "Machines" may also represent workers in a factory and "jobs" may represent their work. In the context of railways discussed above, "machines" may represent stations in a railway network and "jobs" may represent train runs.

Throughout, it is assumed that the following are given: "The Time": $t \in N$; "The Instance" given by sets M, J and resource requirements $R_{i,j} \subset M \times J$, $1 \leq i \leq m$, $1 \leq j \leq n$, and the input to scheduling algorithms; "The Plan" X, which is generally the output of scheduling algorithms; "The Schedule" $s_{i,j}$ for each $1 \leq i \leq m$ and $1 \leq j \leq n$, which is generally the output of scheduling algorithms; and "The Observations" $y_{i,j}$ for each $1 \leq i \leq m$ and $1 \leq j \leq n$ such that $J_j$ on machine $M_i$ was started at time $A_{i,j} \leq t$. In the training phase, an internal representation of a certain Markov chain is produced. In the forecasting phase, this Markov chain is used to derive distributional forecasts of $D_{i,j}$, $A_{i,j}$, where $D_{i,k}$, $A_{i,j} > t$.

As suggested above, the following model is assumed for processing of job $J_j$ at machine $\alpha$ in sequence $s_j = (\ldots, \alpha, \beta, \ldots)$.

$$D_{\alpha,j} = s_{\alpha,j} + f\left(s_{\alpha,j} - \max_{(i,k) \in R_{\alpha,j}} \{A_{i,k}\}\right) + Y_{\alpha,s_{i,j}} \quad (1)$$

$$A_{\alpha,j} = D_{\alpha,j} + \tau_{\alpha,\beta} + V_{\alpha,\beta} \quad (2)$$

where: $s_{\alpha,j}$ is the scheduled time of starting processing job $J_j$ on machine $\alpha$; $D_{\alpha,j}$ is the actual start of processing job $J_j$ on machine $\alpha$; $R_{\alpha,j}$ is the resource requirements, which need to finish before job $J_j$ can be processed on machine $\alpha$; $\tau_{\alpha,\beta}$ is the sequence dependent set-up time, e.g. scheduled duration of movement from machine $\alpha$ to $\beta$; $A_{\alpha,j}$ is the actual availability of job $J_j$ to be accepted on the machine $\beta$ following machine $\alpha$ in sequence $S_j = (\ldots, \alpha, \beta, \ldots)$; $V_{\alpha,\beta}$ is a noise term for moving any job $J_j$ from machine $\beta$ following machine $\alpha$ in sequence $s_j = (\ldots, \alpha, \beta, \ldots)$; and $Y_{\alpha,t}$ is a noise term for processing job $J_j$ at machine $\alpha$ at time t.

Notice that in this model, the crucial random variable is Y. In particular delays $(D_{\alpha,j} - s_{\alpha,j})_+$, where $(\bullet)_+$ denotes the positive part, are explained by two factors in this model. The first factor is the propagation of delays, i.e. the availability of resources required to process the job. This "reactionary component" is, however, rather mechanistic and is represented as: $f(x) = c - x$, if $x \leq c$, or $= 0$, otherwise, where c is a constant in the chosen units of time, to capture the impact that late arrival of resources has on start of processing. The second factor is the random variables $Y_{\alpha,t}$, whose observations are $y_{\alpha,t}$. To simplify notation, $y_{\alpha,t}$ is replaced for processing job $J_j$ at machine $\alpha$ time t, such as $s_{i,j}$, by simply $y_j$. In particular, the constant c in the expression may be the minimum amount of time, required by the machining of the part at the given machine, under the best possible conditions.

For any j and k>j, it is desired to know the conditional density $$f(y_k | (y_0, c_0), \ldots, (y_j, c_j)).$$

A HMM is used to capture this conditional density:

$$f(y_k | (y_0, c_0), \ldots, (y_j, c_j)) = \sum_{x_{t_k}} f(y_k, x_{t_k} | (y_0, c_0), \ldots, (y_j, c_j)).$$

where $t_k$ represents the scheduled time of departure k and $X_{t_k}$ is a latent state variable at that time. It is assumed that the observations at time t are conditionally independent of all other observations given $x_t$. So, $$f(y_k, x_{t_k} | (y_0, c_0), \ldots, (y_j, c_j)) =$$
$$f(y_k | x_{t_k}, (y_0, c_0), \ldots, (y_j, c_j)) p(x_{t_k} | (y_0, c_0), \ldots, (y_j, c_j)) =$$
$$f(y_k | x_{t_k}) p(x_{t_k} | (y_0, c_0), \ldots, (y_j, c_j)).$$

It is assumed that the states follow a Markov chain, so $$p(x_{t_k}, (y_0, c_0), \ldots, (y_j, c_j)) =$$
$$\sum_{x_0, \ldots, x_{t_j}} p_0(x_0) p(x_{c_0} | x_0) \ldots p(x_{t_k} | x_{t_j}) \ldots q(y_j, c_j | x_{t_j}).$$

Once the stochastic model is trained, the following factors are known: $\rho_0(x)$ is the probability mass function (PMF, for specifying a distribution of a discrete random variable) of initial states of the Markov chain; $p(x_t | x_{t-1})$ is the transition matrix of the Markov chain; q(c|x) is the conditional PMF of delay code given the state; and r(y|c, x) is the conditional distribution of delay times given the delay code and state. Once these factors are known, probabilities of states x of trains stations in the railway context (or machines in the machine context) can be iteratively forecast using p and probabilities of actual delays y can be iteratively forecast using r. See FIG. 10 for example iterations.

HMMs in a railway context are now discussed. A simplified model of railway operations includes: a schedule as a collection of train movements with planned departure and arrival times, where a train movement can only commence when certain other train movements ("predecessor train movements" or "predecessors") are complete; delays that are unanticipated changes in the start time or duration of a train movement; reactionary delays result from delays in predecessors (e.g., a train is delayed because it is behind a delayed train and must maintain a certain minimum headway; root delays that occur even when all predecessors are complete (e.g., construction on a section of track reduces speed below schedule, many boarding passengers delay departure from a station, mechanical problems affecting a signal).

The hidden states are time and location specific, and could be inferred from observations, e.g., reduced speed on a section of track, high volume of passengers at a station, faulty equipment at a station. In this embodiment, a method for modeling probabilities of states the stations are in and probabilities of delays as a function of predecessors' delays and the states of the stations are presented. For example: several consecutive trains are delayed in departing a station; it might be inferred that this station is in a state of high passenger volume or a state related to faulty equipment or people on the railway tracks; based on historical data, how long this state will persist can be estimated; and based on this state estimate, the probabilities of future schedule disruptions and their reactionary impacts can be estimated. More complex embodiments are also contemplated.

In more detail: departure times are modeled as scheduled start time+reactionary delay+station-state-specific term; arrival times are modeled as start time+scheduled duration+train-movement-specific term; and models for the station-state-specific and train-movement-specific terms are learned from past data. In formal notation:

$$D_i = s_i + f(s_i - \max\{A_j\} \text{ for } j \in R_i) + Y_{\alpha i, Si} \text{ and } A_i = D_i + \tau_i + V_i$$

where: si is the scheduled departure time of train movement i; $D_i$ is the actual departure time of train movement i; $R_i$ is the set of "predecessor" movements for movement i; $\tau_i$ is the scheduled duration of train movement i; $A_i$ is the actual arrival time of train movement i; $\alpha_i$ is the departure station of train movement i; $Y_{\alpha i, Si}$ is the noise term for train movement i departure time; and $V_i$ is the noise term for train movement i.

In this model, departure delays are explained by two factors. The first factor relates to the predecessors, i.e., the availability of resources required by the train movement prior to departure. In this model, the following equation is used to capture the impact that late arrival of resources has on departure time:

$$f(x) = 2 - x, \text{ if } x \leq 2, \text{ or } = 0, \text{ otherwise.}$$

The second factor relates to the random variables $Y_{\alpha,S}$. Departure delays are expected to be correlated at a given station throughout the day. One can interpret the $f$ as follows: Should the train arrive in the station and have the crew on-board more than three minutes ahead of the scheduled departure, it can leave on time at s_i, independent of how early it has arrived in the station. If the train was late and there were no passengers boarding the train, the train still needs to arrive at the station, board the crew, and leave the doors open for 3 minutes, such that the passengers who may be interested in boarding the train, may board the train.

Figure 7:
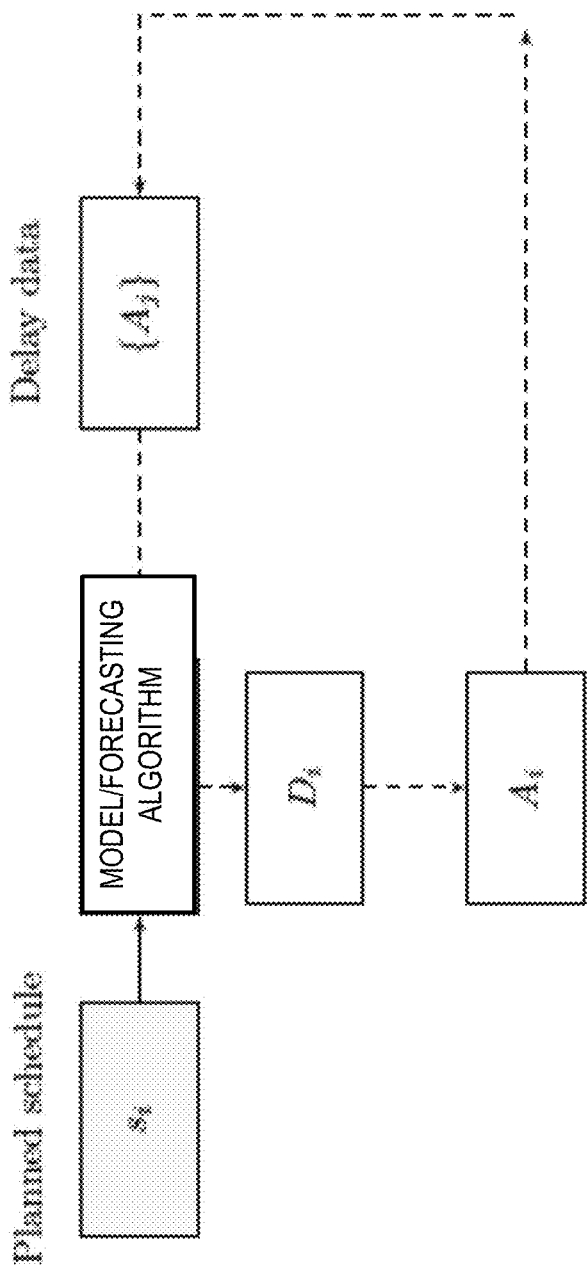
FIG. 7 is an overview of predictive outputs of the process model and forecasting in one embodiment.
Figure 8:
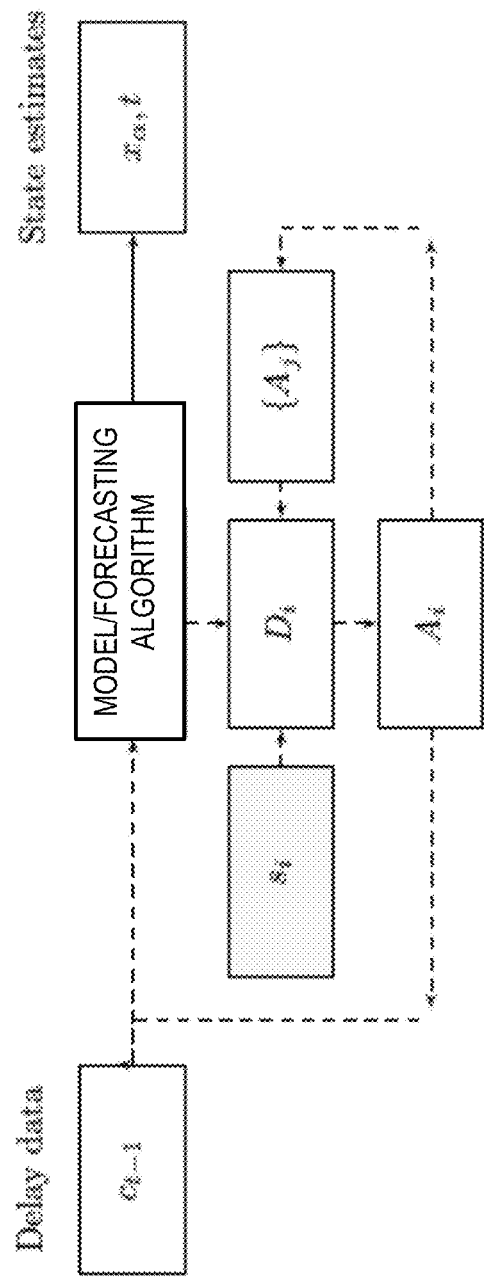
FIG. 8 is an overview of state-estimation outputs of the embodiment.
Figure 9:
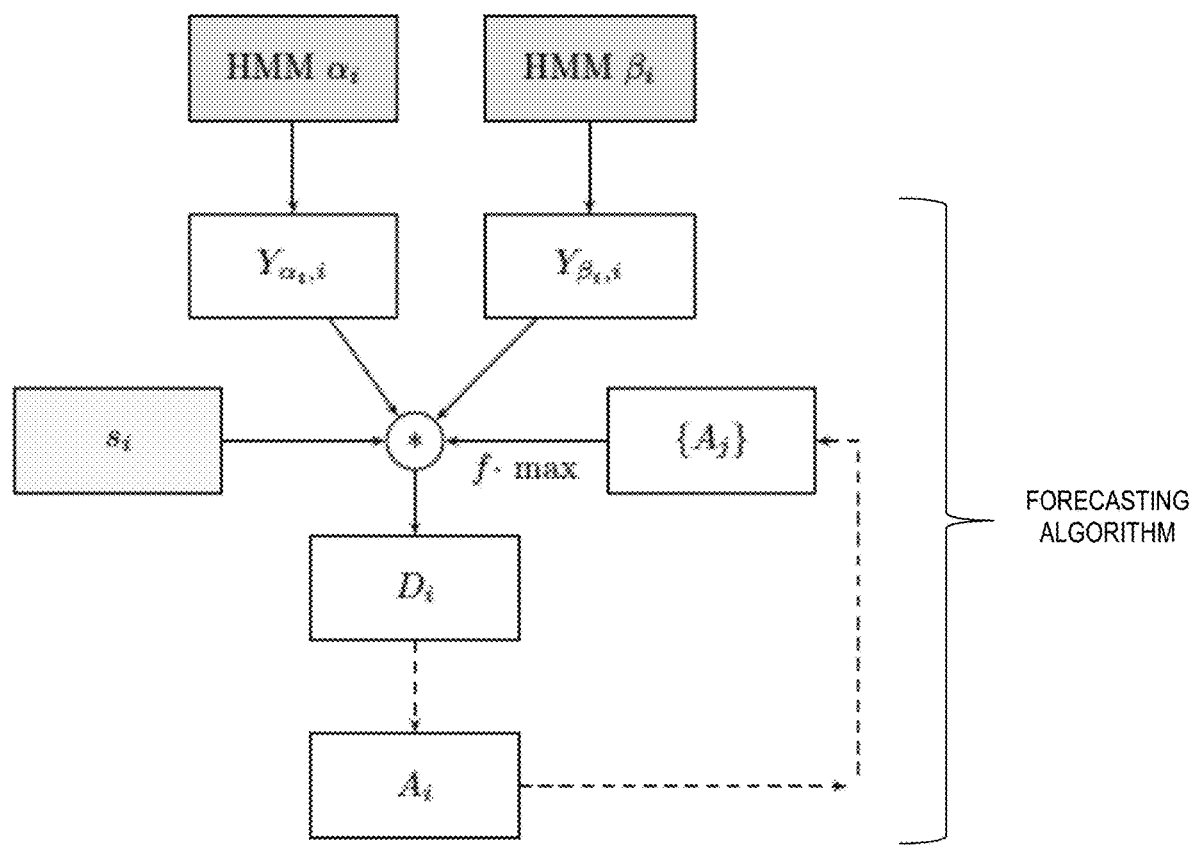
FIG. 9 is an overview of process components of the embodiment for a departure $D_i$ and arrival $A_i$ of a single train movement i.

As illustrated in FIG. 7, in this use case, system and method outputs include probability distributions over current and future states of the resources as a function of delay data. Outside of a function that provides probability distributions of the departure $D_i$ and arrival $A_i$ of the current train movement, probability distributions are also provided of the state $x_{\alpha,t}$ of each resource $\alpha$ at each time t. Notice that each train movement may depend on multiple resources, as is illustrated in FIG. 8. Multiple resources related to the departure of train movement i, e.g., crew $\alpha_i$ and outbound track $\beta_i$ within a station, are modelled with multiple hidden Markov models (HMMs). The schedule data and noise-terms Y related to each resource are convolved (represented by asterisk within circle) with a function of the maximum of arrival times of the predecessors to obtain the departure time. From the departure time, the arrival time is computed, as is illustrated next in FIG. 9, which is used in computation of departure time, for train movements, for which the current train movement is a predecessor.

Figure 10:
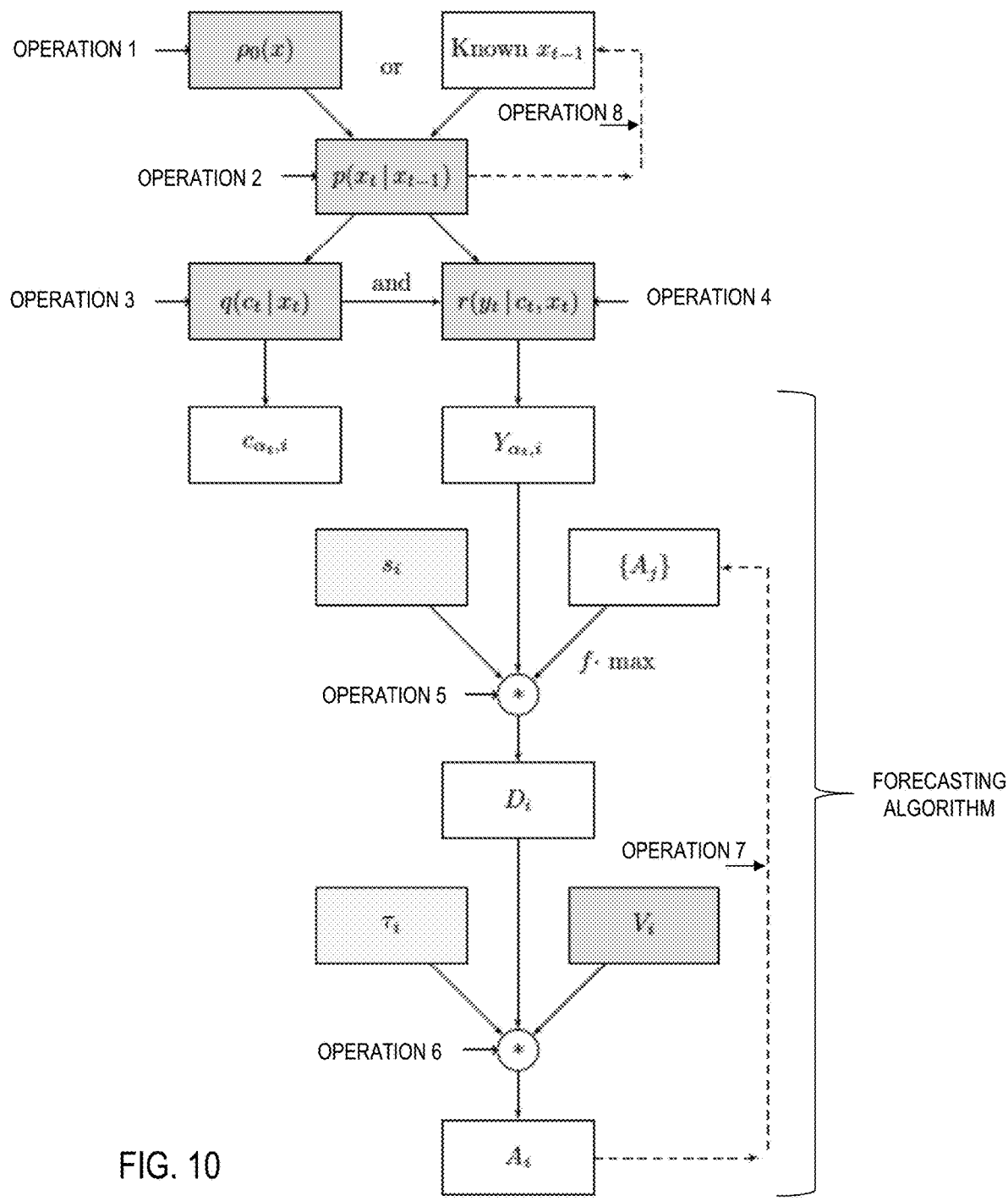
FIG. 10 presents method steps of the prediction of the departure $D_i$ and arrival $A_i$ of a single train movement i, using only a single resource $\alpha_1$.

FIG. 10 presents a process flow diagram of method operations 100 for prediction of the departure $D_i$ and arrival $A_i$ of a single train movement i, using only a single resource $\alpha_i$. In operation 1, for each resource, the initial state distribution $\rho_0(x)$ is sampled to estimate the previous state $x_{t-1}$. This operation involves machine learning using stochastic model and previously obtained historical data. In operation 2, for each resource, the current state $x_t$ conditioned on $x_{t-1}$ is obtained using conditional probability distribution $p(x_t | x_{t-1})$. This operation involves machine learning using stochastic model and previously obtained historical data. In operation 3, for each resource, the delay code $c_t$ conditioned on $x_{t-1}$ is obtained using conditional probability distribution $q(c_t | x_t)$. This operation involves machine learning using stochastic model and previously obtained historical data. In operation 4, for each resource, the departure-related noise-term $Y_{\alpha_i, i}$ conditioned on $x_t$ and $c_t$ is obtained using conditional probability distribution $r(y_t | c_t, x_t)$. This operation involves machine learning using stochastic model and previously obtained historical data. In operation 5, for each train movement, the departure time is estimated as a convolution (asterisk in circle) of $Y_{\alpha_i, i}$, the scheduled departure time $s_i$, and a function of the maximum of arrival times $\{A_j\}$ of predecessors. This operation involves calculations using a processor. In operation 6, for each train movement, the arrival time is estimated as a convolution (asterisk in circle) of the departure time $D_i$, the travel time $\tau_i$, and the arrival-related noise-term $V_i$. In a simple embodiment, the travel time can be a deterministic value of the scheduled travel time, while in more elaborate embodiments, the travel time can be obtained by an independent prediction module. The noise term is a random variable that can delay the arrival of a train and involves machine learning using a stochastic model and historical data. In more elaborate embodiments, this may be $Y\_\{\backslash beta, i+t\}$ for \beta being the next station and t being a travel time. In operation 7, for each train movement, the arrival time is propagated to train movements, for which the current train movement is a predecessor. This operation involves processing using a processor. In operation 8, for each resource, the state is propagated to the next iteration, increment the iteration counter t and repeat from operation 2 through to operation 8. The iterations terminate at the end of the point where forecasts are no longer necessary, e.g., at the end of the day, or at the end of the following day. In operations 1-4 and 7, the stochastic model can be a Markov model, which had been previously hidden, has been estimated in the training phase, and is now being applied. The data $s_i$ in operation 5 and $\tau_i$ in operation 6 are schedule data. The method operations 100 may also include adding the probability distribution of time delays for the start time to the scheduled start time to provide a probability distribution of forecast start times. Similarly, the method operations 100 may also include adding the probability distribution of time delays for the end time to provide a probability distribution of forecast end times.

One example of training HMMs in the railway context is now discussed. For a given station, on a given day, n departures are observed. Departure i occurs at time $D_i$ and reports a delay code of $C_i$. The realization of $Y_{\alpha i, Si}$ for this train movement is:

$$y_{\alpha i, si} = d_i - s_i - f(s_i - \max\{a_j\} \text{ for } j \in R_i).$$

At a given time of day, previous observations of the station-specific delay variables convey some information about future station-specific delays. To simplify notation, replace $y_{\alpha i, si}$ is simply replace by $y_i$. For any j and k>j, the conditional density $$f(y_k | (y_0, c_0), \ldots, (y_j, c_j)) \text{ is desired to be known.}$$

A HMM is used in this example to capture this conditional density:

$$f(y_k | (y_0, c_0), \ldots, (y_j, c_j)) = \Sigma f(y_k, x_{tk} | (y_0, c_0), \ldots, (y_j, c_j))$$
for summation over $x_{tk}$ where $t_k$ represents the scheduled time of departure k and $X_{tk}$ is a latent state variable at that time. It is assumed that the observations at time t are conditionally independent of all other observations given $x_t$. Thus, $$f(y_k, x_{tk} | (y_0, c_0), \ldots, (y_j, c_j)) = f(y_k | x_{tk}, (y_0, c_0), \ldots, (y_j, c_j))$$
$$p(x_{tk} | (y_0, c_0), \ldots, (y_j, c_j))$$
$$= f(y_k | x_{tk}) p(x_{tk} | (y_0, c_0), \ldots, (y_j, c_j))$$

It is assumed that the states follow a Markov chain, thus $$p(x_{tk},(y_0,c_0), \ldots ,(y_j,c_j)) = \Sigma p_0(x_0) p(x_{t0}|x_0) \ldots p(x_{tk}|x_{tj}) q(y_0,c_0|x_{t0}) \ldots q(y_j,x_{tj}) \text{ for summation over } x_0, \ldots, x_{tj}.$$

Above, it is assumed that the Markov chain governing state transitions and the conditional distributions governing observations are time-invariant, but these transitions and distributions may also be implemented as varying in time. Subsequently, algorithms may be used to find a local maximum likelihood solution in polynomial time, e.g., of Viterbi, Baum-Welch, or Baldi-Chauvin, as discussed above.

The two examples above are intentionally simple for teaching purposes and do not fully demonstrate the potential of the invention. Notice, in particular, that only two sub-tasks per task are considered in the scheduling example, where the first sub-task is the true start of the task and the other sub-task starts with the availability of the task at the following machine, and two sub-tasks per task in the railways example, where the first sub-task is the departure and the second is the arrival. Clearly, there could be multiple sub-tasks introduced into each of the examples, e.g., the arrival of a train at a station could consist of seven of more sub-tasks, including entering the area of the approach track, start of breaking, stop moving in a station, open a door, close a door, start the engine, leave the area of the station. In the railway example, the arrival time is considered $A_i = D_i + \tau_i + V_i$, rather than a convolution of $D_i$ with a more complex model of the travel time. One could employ an independent distributional forecasting model for the travel time. Further, a single delay integral code is considered in the railway example, rather multi-variate additional information, which may capture, e.g. weather at the railway station, numbers of ticket purchases over the past 1, 2, 3, . . . , minutes, people passing through the entrance barriers over the past 1, 2, 3, . . . , minutes, and similar. Even further, a single most recent observed delay and a single most recent observed delay code are considered in the example, rather than k most recent delays and delay codes, which may be useful in modelling a limited amount of history, in a so called windowing, at the price of increasing the number of states exponentially in the size of the window. Even further, only the fixed dependence resource is considered, whereas one could consider multiple alternatives for the dependence. That is, for at most k alternatives per task, one could have k bipartite graphs, and there could be a choice of all resources from any single of the k bipartite graphs for any single task.

The present invention provides several advantages. One advantage is that it takes into account that the causes of delays may be complex and are not precisely known. Hence, a probability distribution of delays of start and end times can provide a user such as an operations controller or manager the information needed to make decisions regarding the delays. Another advantage is that it allows published schedules to be updated in real time based on the latest received information. While the invention has been discussed above concerning advantages with respect to the transportation and manufacturing industries, the advantages are also applicable to other industries involved with tasks having scheduled start and end times for the tasks and, in particularly, where delays such as reactionary delays may propagate through a system and affect multiple tasks.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for transforming a physical transportation task having a scheduled start time and a scheduled end time based on forecasting time delays added to the scheduled start time and the scheduled end time of the physical transportation task, the system comprising:
a transport apparatus implementing the physical transportation task;
a processor configured to:
generate a stochastic model of the physical transportation task and the transport apparatus implementing the physical transportation task, the stochastic model comprising a reactionary delay component and a root cause delay component, the reactionary component being a function of previous task end times and the root cause delay component being an independent random process at a specific time;
calculate a probability distribution of time delays added to the scheduled start time as a combination of the reactionary delay component and the root cause delay component using the stochastic model to provide a probability distribution of start times;
calculate a probability distribution of time delays added to the scheduled end time as a combination of the reactionary delay component and the root cause delay component using the stochastic model to provide a probability distribution of end times;
transmit a signal comprising the probability distribution of start times and the probability distribution of end times to a signal receiving device;

wherein the stochastic model comprises a hidden Markov model (HMM);

wherein the HMM comprises:
(a) an initial state distribution $\rho_0(x)$ to estimate a previous state $x_{t-1}$ for each resource;
(b) a current state $x_t$ conditioned on $x_{t-1}$ obtained using conditional probability distribution $p(x_t|x_{t-1})$ for each resource;
(c) additional details $c_t$ conditioned on $x_{t-1}$ obtained using conditional probability distribution $q(c_t|x_t)$ for each resource; and
(d) a departure-related noise-term $Y_{\alpha_i,i}$ conditioned on $x_t$ and $c_t$ obtained using conditional probability distribution $r(y_t|c_t, x_t)$ for each resource;

a signal receiving device configured to receive the signal comprising the probability distribution of start times and the probability distribution of end times;

wherein the physical transportation task is transformed by replacing the transport apparatus implementing the physical transportation task by a computer implemented process in which a computer system is configured to transmit a signal in response to the probability distribution of start times and the probability distribution of end times.

2. The system according to claim 1, wherein the signal receiving device comprises at least one of a display and a printer.

3. The system according to claim 1, wherein the signal receiving device comprises at least one of a non-transitory storage medium and memory.

4. The system according to claim 1, wherein the processor is further configured to train the HMM using historical schedule and delay data.

5. The system according to claim 1, wherein the physical transportation task comprises a plurality of sub-tasks and the processor is further configured to:
generate a stochastic model of each of the sub-tasks and resources implementing the sub-tasks, the stochastic model comprising a reactionary delay component and a root-cause delay component, the reactionary delay component being a function of previous sub-task end times and the root-cause delay component being an independent random process at a specific time;
calculate a probability distribution of time delays added to a scheduled start time of each sub-task as a combination of the reactionary delay component and the root cause delay component of each sub-task using the stochastic model of each of the sub-tasks and resources implementing the sub-tasks to provide a probability distribution of start times of the sub-tasks; and
calculate a probability distribution of time delays added to a scheduled end time of each sub-task as a combination of the reactionary delay component and the root cause delay component of each sub-task using the stochastic model of each of the sub-tasks and resources implementing the sub-tasks to provide a probability distribution of end times of the sub-tasks.

6. The system according to claim 1, wherein the processor is further configured to implement the computer implemented process to prevent a first delay of the physical transportation task from causing a second delay of a second physical transportation task in response to the probability distribution of start times and the probability distribution of end times.

7. The system according to claim 1, wherein the processor is further configured to update in real time a published schedule comprising at least one of a start time and an end time in response to at least one of the probability distribution of start times and the probability distribution of end times.

8. The system according to claim 7, wherein the processor is further configured to implement a second physical transportation task according to the updated published schedule.

9. The system according to claim 1, wherein the physical transportation task is further transformed to incorporate at least one of a new scheduled start time or a new scheduled end time.

10. A system for transforming a physical transportation task having a scheduled start time and a scheduled end time based on forecasting time delays added to the scheduled start time and the scheduled end time of the physical transportation task comprising:
a transport apparatus implementing the physical transportation task;
a processor configured to:
generate a stochastic model of the physical transportation task and the resources implementing the physical transportation task, the stochastic model comprising a reactionary delay component and a root cause delay component, the reactionary component being a function of previous physical transportation task end times and the root cause delay component being an independent random process at a specific time;
calculate a probability distribution of time delays added to the scheduled start time as a combination of the reactionary delay component and the root cause delay component using the stochastic model to provide a probability distribution of start times;
calculate a probability distribution of time delays added to the scheduled end time as a combination of the reactionary delay component and the root cause delay component using the stochastic model to provide a probability distribution of end times; and
transmit a signal comprising the probability distribution of start times and the probability distribution of end times to a signal receiving device;
wherein the physical transportation task comprises a transport stopping at a station and the scheduled start time is a scheduled arrival time of the transport at the station and the scheduled end time is a scheduled departure time of the transport at the station; and
wherein calculating a probability distribution of time delays added to the scheduled end time comprises performing a convolution of $Y_{\alpha_i,i}$, the scheduled departure time $s_i$ and a function of the maximum of arrival times $\{A_j\}$ of predecessor transports;
a signal receiving device configured to receive the signal comprising the probability distribution of start times and the probability distribution of end times;
wherein the physical transportation task is transformed by replacing the transport apparatus implementing the physical transportation task by a computer implemented process in which a computer system is configured to transmit a signal in response to the probability distribution of start times and the probability distribution of end times.

11. The system according to claim 10, wherein the processor is further configured to implement the computer implemented process to prevent a first delay of the task from causing a second delay of a second physical transportation task in response to the probability distribution of start times and the probability distribution of end times.

12. The system according to claim 10, wherein the processor is further configured to update in real time a published schedule comprising at least one of a start time and an end time in response to at least one of the probability distribution of start times and the probability distribution of end times.

13. The system according to claim 12, wherein the processor is further configured to implement a second physical transportation task according to the updated published schedule.

14. The system according to claim 10, wherein the physical transportation task is further transformed to incorporate at least one of a new scheduled start time or a new scheduled end time.

15. A system for transforming a physical transportation task having a scheduled start time and a scheduled end time based on forecasting time delays added to the scheduled start time and the scheduled end time of the physical transportation task comprising:
  a transport apparatus implementing the physical transportation task;
  a processor configured to:
    generate a stochastic model of the physical transportation task and the transport apparatus implementing the physical transportation task, the stochastic model comprising a reactionary delay component and a root cause delay component, the reactionary component being a function of previous physical transportation task end times and the root cause delay component being an independent random process at a specific time;
    calculate a probability distribution of time delays added to the scheduled start time as a combination of the reactionary delay component and the root cause delay component using the stochastic model to provide a probability distribution of start times;
    calculate a probability distribution of time delays added to the scheduled end time as a combination of the reactionary delay component and the root cause delay component using the stochastic model to provide a probability distribution of end times; and
    transmit a signal comprising the probability distribution of start times and the probability distribution of end times to a signal receiving device;
  wherein the physical transportation task comprises the transport stopping at a station and the scheduled start time is a scheduled arrival time of the transport at the station and the scheduled end time is a scheduled departure time of the transport at the station; and
  wherein calculating a probability distribution of time delays added to the scheduled start time comprises performing a convolution of a departure time $D_i$, a scheduled travel time $\tau_i$ and an arrival-related noise-term $V_i$;
  a signal receiving device configured to receive the signal comprising the probability distribution of start times and the probability distribution of end times;
  wherein the physical transportation task is transformed by replacing the transport apparatus implementing the physical transportation task by a computer implemented process in which a computer system is configured to transmit a signal in response to the probability distribution of start times and the probability distribution of end times.

16. The system according to claim 15, wherein the processor is further configured to implement the computer implemented process to prevent a first delay of the physical transportation task from causing a second delay of a second physical transportation task in response to the probability distribution of start times and the probability distribution of end times.

17. The system according to claim 15, wherein the processor is further configured to update in real time a published schedule comprising at least one of a start time and an end time in response to at least one of the probability distribution of start times and the probability distribution of end times.

18. The system according to claim 17, wherein the processor is further configured to implement a second physical transportation task according to the updated published schedule.

19. The system according to claim 15, wherein the physical transportation task is further transformed to incorporate at least one of a new scheduled start time or a new scheduled end time.

* * * * *